P. MANDEVILLE.
REFRIGERATOR BUILDING.
APPLICATION FILED JAN. 29, 1919.

1,413,230. Patented Apr. 18, 1922.
2 SHEETS—SHEET 1.

Witness
Milton Lenoir

Inventor
Paul Mandeville,
Adams Jackson
Attorneys.

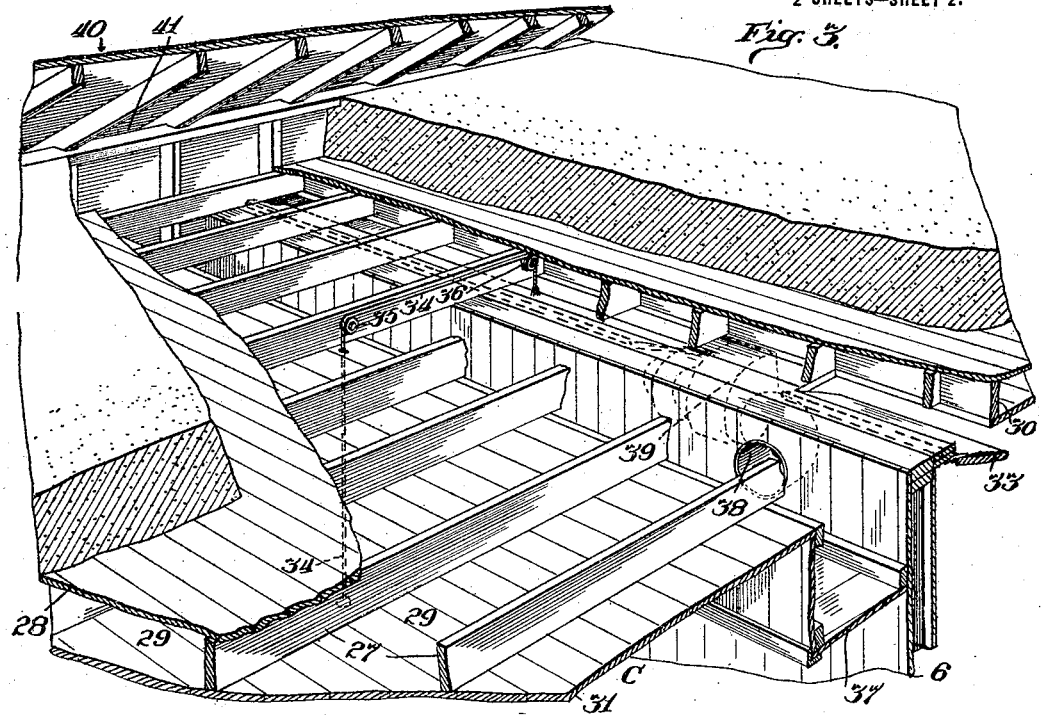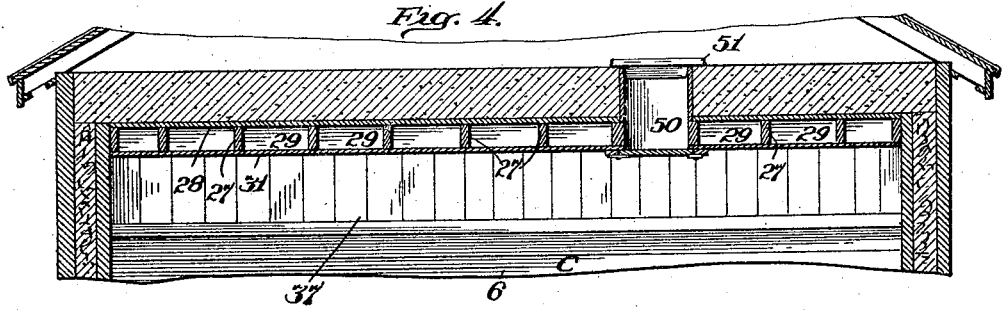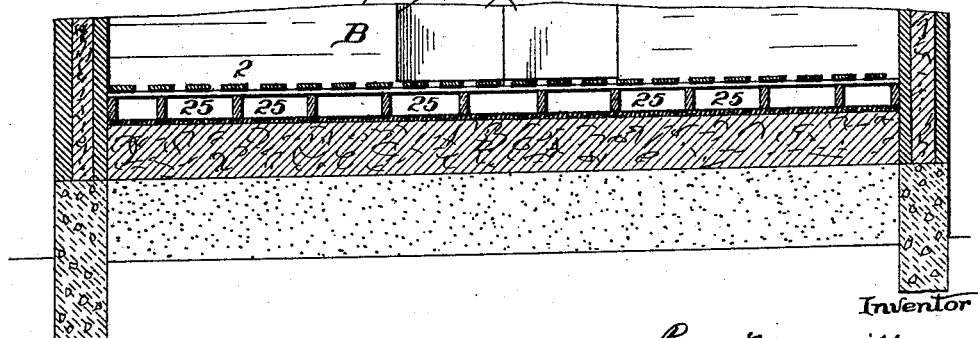

UNITED STATES PATENT OFFICE.

PAUL MANDEVILLE, OF CHICAGO, ILLINOIS.

REFRIGERATOR BUILDING.

1,413,230.  Specification of Letters Patent. Patented Apr. 18, 1922.

Application filed January 29, 1919. Serial No. 273,783.

*To all whom it may concern:*

Be it known that I, PAUL MANDEVILLE, a citizen of the United States, and a resident of Chicago, in the county of Cook and State of Illinois, have invented certain new and useful Improvements in Refrigerator Buildings, of which the following is a specification, reference being had to the accompanying drawings.

My invention has to do with the cold storage or pre-cooling of perishable food products such as eggs, poultry, etc. The poultry and egg business is one of the largest industries in the country in volume, yet heretofore it has not been conducted along efficient lines, owing largely to the absence of facilities readily accessible to the sources of production for cooling and storing the eggs or poultry until such time as they could be marketed under favorable conditions. In small communities, where the local business is not of sufficient volume to justify the investment required to erect and maintain a large cold storage warehouse equipped with the usual refrigerating machinery, farmers, and also the ultimate consumers, have suffered either from the necessity of shipping in small lots under unfavorable conditions as to transportation charges and preservation en route, or from the collection of the produce in sufficient quantity to enable shipment to be made under favorable conditions, without cold storage facilities during the time required for such collection. In either case a considerable loss is almost certain through depreciation. The desirability of a cold storage or pre-cooling structure which could be built at comparatively small cost, and could be operated at very little expense so that it would be practicable to provide such structures in very small communities has theretofore been well understood, but prior to my invention this want has not been supplied, and so far as I know, the refrigerator building hereinafter described, which embodies the invention which forms the subject-matter of this application, is the first structure which meets the requirements of the situation. In other words, the object of my invention is to provide a refrigerator building which may be cheaply constructed and cheaply operated both as regards the maintenance of the requisite temperature and degree of humidity in the storage room, and the facility of access to the several parts of the structure either for replenishing the supply of ice or for the introduction or removal of the articles handled for storage or pre-cooling purposes. I accomplish this object as illustrated in the drawings and as hereinafter described. What I regard as new will be set forth in the claims.

In the accompanying drawings:—

Fig. 3 is a fragmentary perspective view illustrating a part of the ceiling construction, and showing the duct used when forced circulation is desired;

Fig. 4 is a partial vertical cross section on line 4—4 of Fig. 1; and

Fig. 5 is a partial vertical cross section on line 5—5 of Fig. 1, showing the construction of the floor of the cooling room or chamber.

Figure 1:
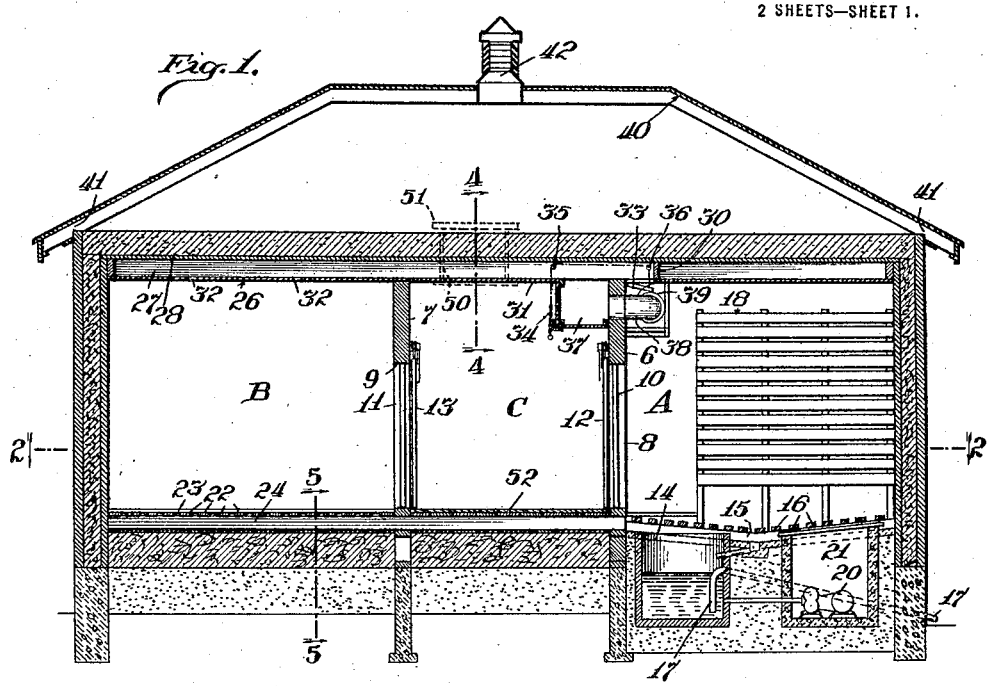
Fig. 1 is a central vertical section of my improved refrigerator building, taken on line 1—1 of Fig. 2.
Figure 2:
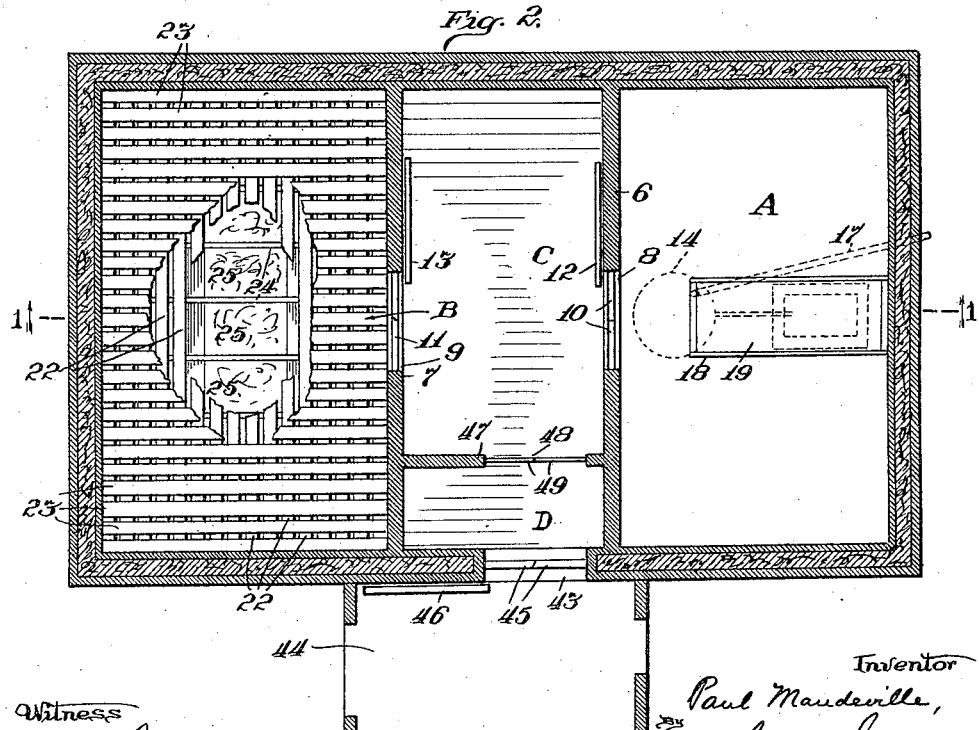
Fig. 2 is a horizontal section, substantially on line 2—2 of Fig. 1.

My improved refrigerator building, in the embodiment thereof illustrated, comprises three rooms or chambers, A, B, C, separated by partitions 6—7, in which are doorways 8—9, respectively, adapted to be closed by double swinging doors 10—11 and sliding doors 12—13, as shown in Fig. 2. The refrigerant or ice containing chamber A is adapted to contain a mass of ice dumped loosely therein, and is provided with a suitable floor of concrete or other suitable material arranged to drain into a sump 14 sunk in the floor of said compartment, as shown in Fig. 1. 15 indicates joists which extend transversely of the ice chamber floor and support a series of slats 16 which form an open-work floor on which the ice rests. The spaces between the joists 15 form ducts for conducting cold air from the lower portion of the ice chamber A under the intermediate chamber C to the cooling chamber B, as will be hereinafter described. The sump is provided with an overflow pipe 17 arranged to prevent the water accumulating in the sump from rising beyond a predetermined height, as shown in Fig. 1.

18 indicates a rack placed in the ice chamber A, preferably centrally thereof, opposite the doorway 8, as shown in Fig. 2, which rack is designed to support a number of shallow pans 19 which go to make up an apparatus for regulating the humidity of the air in the ice chamber according to the method described and claimed in Letters Patent No. 1,276,241, granted to me August 20, 1918. Said patent illustrates and describes in detail the apparatus which I prefer to use, and which is indicated in a general way in the present drawings. It will suffice for the purpose of this application to say that cold water supplied by the melting ice is pumped from the sump 14 by a pump 20, preferably placed in a well 21 sunk below the floor of the ice chamber, into the uppermost pan of the series, and then overflows into the next lower pan in which it flows back to the opposite end of the rack where it again flows into the next lower pan, and so on, until it is returned to the sump. Thus a large area of exposed liquid is provided which, by its contact with the air, causes the condensation of moisture carried by the air. The humidity of the air is regulated by covering a greater or less area of the water by means of pans floated upon the surface of the water in one or more of the large pans, as pointed out in my said patent.

The cold storage or pre-cooling room B is provided with a reticulated floor composed of longitudinal boards or strips 22 spaced apart, on which are laid cross strips 23, also spaced apart, as illustrated in Figs. 1 and 2. The under boards 22 are laid upon joists 24 which extend transversely of the chambers B and C, and being spaced apart, form ducts 25, shown in Fig. 5, which communicate with the ducts between the joists 15 of the ice chamber A. Thus cold air may flow from the lower portion of the ice chamber through said ducts under the floors of the intermediate chamber C and the cooling chamber B, where it rises into the latter chamber. As the air becomes warmer it rises to the ceiling of the cooling chamber, and as will be hereinafter more particularly described, passes over the ceiling of the intermediate chamber C back into the upper portion of the ice chamber A, where it is again cooled, thus providing a gravity circulation through the cooling chamber B and around the intermediate chamber C.

26 indicates the ceiling of the cooling chamber B which is secured to joists 27 which extend transversely over the chambers A—B—C above the partitions 6—7, as shown in Fig. 1. Said joists are spaced apart in the usual way, and are covered by a tight ceiling 28, as shown in Fig. 4, so that the two ceilings 26—28 and the joists again form a series of ducts 29 which lead from over the cooling chamber B to a point slightly beyond the partition 6, where they are closed by cross pieces 30, as shown in Fig. 1. The ceiling 31 of the intermediate chamber C is preferably continuous with the ceiling 26 of the cooling chamber B, and forms the bottom of the ducts 29 where they pass over said intermediate chamber. As shown in Fig. 1, the cross pieces 30 are placed a short distance from the partition 6 at the ice chamber side thereof so that the ducts 29 extend slightly beyond said partition and such extended portions of said ducts open into the ice chamber, thereby permitting the returning air to flow thereinto. The ceiling 26 of the cooling chamber is provided with a series of openings 32 at convenient points to permit the air rising in said chamber to enter said ducts, as shown in Fig. 1. 33 indicates swinging doors provided to close or regulate the size of the openings of the ducts 29 into the ice chamber. Preferably I provide two of said doors, each extending half-way the length of the ice chamber. The position of said doors may be controlled by cords or chains 34 hanging down into the intermediate chamber C and extending over pulleys 35—36 to the point of their attachment to said doors. Any suitable means may be provided for holding said chains when adjusted.

In order to provide for maintaining a forced circulation of air when desired, I provide a duct 37 which extends longitudinally of the intermediate chamber C adjacent to the partition 6 and next to the ceiling of said chamber, as shown in Figs. 1 and 3. This duct communicates with the ducts 29 as the ceiling 31 is cut away over it, as shown in Fig. 1. Consequently the air flowing through the ducts 29 may pass into the duct 37. The latter duct is connected centrally of its length by a pipe 38 with a fan or blower 39 of any suitable description, which discharges into the ice chamber A. This fan, which may conveniently be driven by an electric motor, therefore operates to draw air through the ducts 29 and discharge it into the ice chamber, thereby causing a more rapid circulation from the ice chamber to the ducts 25 which lead to the cooling chamber. When this fan is in operation the swinging doors 33 are closed so that the air going to the fan necessarily comes from the cooling chamber. When the fan is not in operation the doors 33 are opened, and the circulation of the air by gravity hereinbefore described will take place.

The outer walls of the several chambers are double and are properly insulated, as shown in Figs. 1 and 2, and the ceilings of said chambers are also insulated, as shown in said figures. Also the floors of the chambers B and C are insulated, so that the interior of said chambers and the ducts through which the cooling air circulates are not materially affected by the outside temperature. The material which I prefer to use for insulating the several chambers is baled compressed shavings, but no claim is herein made to such insulation, as I am about to file a separate application for patent therefor. In so far as my present invention is concerned, any suitable insulation which will properly protect the several chambers may be employed.

40 indicates the roof of the building, which extends over the several chambers and is provided adjacent to its eaves with passages 41 to permit outside air to pass up under the roof. It is also provided with a central vent 42 for the escape of heated air. Thus air may circulate over the several chambers to aid in keeping them cool in hot weather.

43 indicates a doorway leading into the intermediate chamber C from a loading platform 44. Said doorway is closed by double swinging doors 45 and a sliding door 46, as shown in Fig. 2. Preferably the intermediate chamber C is further insulated from the outer atmosphere by a partition 47 forming a vestibule D. The partition 47 is provided with a doorway 48 provided with double swinging doors 49, as shown in Fig. 2. It will be understood that all of the double swinging doors hereinbefore referred to are hung on spring hinges arranged to keep the doors normally shut, and to permit them to swing in either direction so that by pushing a truck against them they may be opened. 50 indicates a scuttle in the ceiling of the intermediate chamber C which opens into the space under the roof and is closed by an insulated cover 51, thus affording convenient access to the attic or space under the roof. The intermediate chamber C is provided with an imperforate double floor 52, as shown in Fig. 1, so that the cold air flowing to the cooling chamber B cannot escape into the intermediate chamber.

The intermediate chamber C is used as a shipping room, and as a passage-way for affording convenient access either to the ice chamber or to the cooling chamber. It also serves as a means of further insulating the other two chambers from the outer atmosphere as the temperature in the shipping room is always cool, and consequently when the doors into the ice or cooling chambers are temporarily opened in the ordinary operation of the house, the temperature in those rooms is not materially affected. The temperature in the shipping room is maintained at a relatively low point by reason of the fact that the air which cools the cooling room flows immediately under the floor of the shipping room and the returning warmer air, which, however, is still quite cool, flows over the ceiling of the shipping room. Besides, the partitions between the ice and cooling chambers and the shipping room, while providing a large measure of insulation, are not intended to completely insulate the shipping chamber from the others.

From the foregoing description it will be apparent that by placing a mass of ice in the ice chamber A the air therein will be cooled and its humidity regulated by the controlling apparatus provided in said chamber. The cooled air will sink to the floor of the ice chamber and will then pass through the ducts or flues provided by the joists under the floors of the chambers B—C, rising through the floor of the cooling chamber where it will be warmed to some extent by the heat given off by the articles in storage. The warmer air will rise through the ceiling of the cooling chamber and then flow back to the ice chamber, entering said chamber through the openings adjacent to the partition 6, provided the doors 33 are open and the fan is not in operation. Thus a continuous gravity circulation of cooling air is provided by which it is possible to maintain the temperature in the cooling chamber very nearly the same as that in the ice chamber. By introducing the cold air at the bottom of the cooling chamber instead of at the top, eddies are avoided and the room is cooled more uniformly throughout its area and a more nearly uniform temperature is maintained between the cooling chamber and the ice chamber. The design of the ice chamber permits it to receive a large body of ice disposed in mass so that the entire body of ice acts to cool the air and serves as a stabilizer of the temperature so that it is maintained more nearly uniform. The arrangement of the several chambers so that they are protected from outside temperature also conserves ice and enables the plant to be operated at comparatively slight expense for ice. If, for any reason, the normal gravity circulation of the air is not sufficient to maintain the desired temperature in the cooling chamber, as, for example, if the cooling chamber is well filled, or if the ice supply is low, or if the articles stored give off an unusual amount of heat, a forced circulation of air may be maintained by closing the doors 33 and operating the fan 39. By this means the rapidity of the flow of air may be increased to any desired extent. It will be noted that there is only one outside door opening through which access is had to the three chambers, and this is an important factor in conserving cold and reducing the cost of operation.

The pump by which the meltage from the ice is pumped into the uppermost pan of the humidifying apparatus may be driven by an electric motor, and is preferably placed in a well, as shown in the drawings, but it may be located in any other position, and may be driven by any suitable means. It may also be provided with automatically acting means for starting and stopping it, controlled either by the level of the water in the sump, or by the temperature in the ice chamber, as may be preferred. This meltage is, of course, quite cold, and the circulation of the water through the several pans has considerable effect in reducing the temperature of the air in said chamber. Therefore, by controlling the rapidity of the flow of the ice water by varying the operation of the pump by means of suitable thermostatic controlling mechanism, the temperature in the ice chamber may be very accurately controlled. Where a lower temperature is required than can be obtained by the natural melting of the ice, salt may be thrown upon the mass of ice, thereby reducing its melting point, or ice and salt may be added to the meltage in the sump. The resulting brine may be circulated through the pans in the manner already described. My improved building is, therefore, well adapted for use for cold storage purposes, although it is primarily intended for pre-cooling and transient storage. While I have described it as used for storing eggs and poultry, it may, of course, be used for treating any other articles requiring pre-cooling or storage at a low temperature.

What I claim as my invention and desire to secure by Letters Patent, is:—

1. A refrigerator building comprising an ice chamber, a sump below the level of the floor thereof for receiving the meltage from the ice, a series of pans in said ice chamber, means for delivering water from said sump to said pans, a cooling chamber separate from said ice chamber, and means for causing air from said ice chamber to circulate through said cooling chamber.

2. A refrigerator building comprising an ice chamber, a sump for receiving the meltage from the ice, a series of pans in said ice chamber, means for delivering water from said sump to said pans, a cooling chamber, an intermediate chamber between said ice and cooling chambers, and means for conducting air from the lower portion of said ice chamber under said intermediate chamber to the lower portion of said cooling chamber and for returning air from the upper portion of said cooling chamber to said ice chamber.

3. A refrigerator building comprising an ice chamber, a sump for receiving the meltage from the ice, a series of pans in said ice chamber, means for delivering water from said sump to said pans, a cooling chamber, an intermediate chamber between said ice and cooling chambers, means for conducting air from the lower portion of said ice chamber under said intermediate chamber to the lower portion of said cooling chamber and for returning air from the upper portion of said cooling chamber to said ice chamber, and means for maintaining a forced circulation of the air.

4. A refrigerator building comprising an ice chamber, a cooling chamber, an intermediate chamber between said ice and cooling chambers, ducts leading from the ice chamber under the intermediate chamber to the lower portion of the cooling chamber, ducts leading from the upper portion of the cooling chamber over said intermediate chamber to the ice chamber, and means whereby air may be caused to circulate through said ducts either by gravity or by forced circulation.

5. A refrigerator building comprising an ice chamber, a cooling chamber, and an intermediate chamber having doorways communicating with said ice and cooling chambers, means for causing air from said ice chamber to circulate through said cooling chamber and around and without said intermediate chamber, and an outside doorway for said intermediate chamber.

6. A refrigerator building comprising an ice chamber, a cooling chamber, and an intermediate chamber having doorways communicating with said ice and cooling chamber, means for causing air from said ice chamber to circulate through said cooling chamber and around and without said intermediate chamber, an outside doorway for said intermediate chamber, and a vestibule between said intermediate chamber and said outside doorway.

7. A refrigerator building comprising an ice chamber, a cooling chamber, and an intermediate chamber having an outside doorway and doorways communicating with said ice and cooling chambers, floor joists extending under said cooling and intermediate chambers to form ducts communicating with said ice chamber, an imperforate floor in said intermediate chamber laid on said joists, a perforate floor in said cooling chamber laid on said joists, and means for conducting air from the upper portion of the cooling chamber to said ice chamber.

8. A refrigerator building comprising an ice chamber, a cooling chamber, and an intermediate chamber having an outside doorway and doorways communicating with said ice and cooling chambers, means for conducting air from the lower portion of said ice chamber under said intermediate chamber to the lower portion of said cooling chamber, ceiling joists extending over said cooling and intermediate chambers and forming ducts for conducting air from the upper portion of said cooling chamber back to said ice chamber, a ceiling in said cooling chamber having openings for the admission of air to said ducts, and an imperforate ceiling for said intermediate chamber.

9. A refrigerator building comprising an ice chamber, a cooling chamber, and an intermediate chamber communicating with said ice and cooling chambers, said intermediate chamber having an outside doorway, insulated outside walls for said chambers, said walls being unbroken except for a single doorway opening into said intermediate chamber, means insulating said chambers below the floors thereof and above the ceilings thereof, and means for causing air from said ice chamber to circulate through said cooling chamber and around and without said intermediate chamber.

10. A refrigerator building comprising an ice chamber, a cooling chamber, and an intermediate chamber communicating with said ice and cooling chambers, said intermediate chamber having an outside doorway, insulated outside walls for said chambers, said walls being unbroken except for a single doorway opening into said intermediate chamber, means insulating said chambers below the floors thereof and above the ceilings thereof, means for causing air from said ice chamber to circulate through said cooling chamber and around and without said intermediate chamber, and a roof for said building arranged to permit air to circulate over said chambers.

11. A refrigerator building comprising an ice chamber, a cooling chamber, and an intermediate chamber communicating with said ice and cooling chambers, said intermedite chamber having an outside doorway, insulated outside walls for said chambers, said walls being unbroken except for a single doorway opening into said intermediate chamber, means insulating said chambers below the floors thereof and above the ceilings thereof, means for causing air from said ice chamber to circulate through said cooling chamber and around and without said intermediate chamber, and a roof having a ventilator at the top and openings adjacent to its eaves to permit air to flow thereunder.

PAUL MANDEVILLE.